US010733071B2

(12) United States Patent
Gomes (10) Patent No.: US 10,733,071 B2
(45) Date of Patent: Aug. 4, 2020

(54) TEST PROGRAM DATA KEY GENERATION

(71) Applicant: INTERNATIONAL BUSINESS MACHINES CORPORATION, Armonk, NY (US)

(72) Inventor: Louis P. Gomes, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 175 days.

(21) Appl. No.: 16/059,322

(22) Filed: Aug. 9, 2018

(65) Prior Publication Data

US 2020/0019481 A1    Jan. 16, 2020

Related U.S. Application Data

(60) Provisional application No. 62/697,822, filed on Jul. 13, 2018.

(51) Int. Cl.
*G06F 11/00* (2006.01)
*G06F 11/263* (2006.01)
*G06F 11/36* (2006.01)
*G06F 7/58* (2006.01)

(52) U.S. Cl.
CPC ........ *G06F 11/263* (2013.01); *G06F 11/3684* (2013.01); *G06F 11/3688* (2013.01); *G06F 11/3692* (2013.01); *G06F 7/582* (2013.01)

(58) Field of Classification Search
CPC . G06F 11/263; G06F 11/3684; G06F 11/3688
See application file for complete search history.

(56) References Cited

U.S. PATENT DOCUMENTS 6,490,721 B1   12/2002   Gorshkov et al.
6,728,654 B2   4/2004    Boehm
(Continued)

OTHER PUBLICATIONS

Bayerri, Grammar and model extraction for security applications using dynamic program binary analysis. Diss. Carnegie Mellon University, 2010.
(Continued)

*Primary Examiner* — Charles Ehne
(74) *Attorney, Agent, or Firm* — Cantor Colburn LLP; Teddi Maranzano (57) ABSTRACT

Systems, methods, and computer-readable media are disclosed for providing a test program with the capability to build and execute instructions and their functions (test streams) that have experienced failure so as to reproduce output errors as desired and improve the chances of determining the cause of the output errors. The test program allows a user to provide a data key seed that was used during a prior pass of the test program that produced an error output and a data key generation frequency value (N) that would be used to generate new program and data seeds every N passes of the test program. The user-provided key seed can be used to regenerate the same data keys that were generated in the prior test program pass that produced the error output. This mechanism enables the test program to recreate the same test stream of the error output from the prior pass.

20 Claims, 6 Drawing Sheets

(56) References Cited

U.S. PATENT DOCUMENTS

2002/0154769 A1* 10/2002 Petersen ................. G06F 7/586
                                                    380/42
2004/0078402 A1*  4/2004 Butler ..................... G06F 7/588
                                                    708/252
2004/0086117 A1*  5/2004 Petersen ................. H04L 9/001
                                                    380/44

OTHER PUBLICATIONS

Beebe. "Random numbers." The Mathematical-Function Computation Handbook. Springer, Cham, 2017. 157-214.
Christopher J. Thompson et al. "Randomness Exposed—An Attack on Hosted Virtual Machines." Dept. of Computer Science, University of Minnesota (date not available).
Keren Tan et al, "From Map to Dist: the evolution of a large-scale WLAN monitoring system." IEEE Transactions on Mobile Computing 13.1 (2014): 216-229.
Leo Dorrendorf et al., "Cryptanalysis of the random number generator of the windows operating system." ACM Transactions on Information and System Security (TISSEC) 13.1 (2009): 10.

\* cited by examiner

TEST PROGRAM DATA KEY GENERATION

DOMESTIC PRIORITY

This application claims priority and benefit to U.S. Provisional Application No. 62/697,822, entitled "TEST PROGRAM DATA KEY GENERATION", filed Jul. 13, 2018, the content of which is incorporated herein by reference in its entirety.

BACKGROUND

The present invention relates generally to software testing, and more specifically, to data key generation during execution of a test program.

Software testing involves the execution of a software component or a system component to evaluate one or more properties of interest. In general, these properties indicate the extent to which the component under test meets the requirements that guided its design and development; responds correctly to all kinds of inputs; performs its functions within an acceptable timeframe; is sufficiently usable; can be installed and run in its intended environments; and achieves the general result its stakeholders desire.

All software testing uses some type of strategy to select tests that are feasible for the available time and resources. As a result, software testing typically (but not exclusively) attempts to execute a program or application with the intent of finding software bugs (errors or other defects).

SUMMARY

In one or more example embodiments, a method for data key generation during execution of a test program is disclosed. The method first includes initializing, in connection with an initial pass of the test program, a key seed to a first default value. The method further includes generating, during a current pass of the test program, a data seed having a data seed value and storing the data seed value. The method additionally includes receiving, during the current pass of the test program, a user-specified key seed value and setting the key seed to the user-specified key seed value. The method additionally includes setting, during the current pass of the test program, the data seed to the user-specified key seed value; generating one or more data keys based at least in part on the data seed having the user-specified key seed value; and resetting the data seed to the stored data seed value.

In one or more other example embodiments, a system for data key generation during execution of a test program is disclosed. The system includes at least one memory storing computer-executable instructions and at least one processor configured to access the at least one memory and execute the computer-executable instructions to perform a set of operations. The operations first include initializing, in connection with an initial pass of the test program, a key seed to a first default value. The operations further include generating, during a current pass of the test program, a data seed having a data seed value and storing the data seed value. The operations additionally include receiving, during the current pass of the test program, a user-specified key seed value and setting the key seed to the user-specified key seed value. The operations additionally include setting, during the current pass of the test program, the data seed to the user-specified key seed value; generating one or more data keys based at least in part on the data seed having the user-specified key seed value; and resetting the data seed to the stored data seed value.

In one or more other example embodiments, a computer program product for data key generation during execution of a test program is disclosed. The computer program product includes a non-transitory storage medium readable by a processing circuit, the storage medium storing instructions executable by the processing circuit to cause a method to be performed. The method includes initializing, in connection with an initial pass of the test program, a key seed to a first default value. The method further includes generating, during a current pass of the test program, a data seed having a data seed value and storing the data seed value. The method additionally includes receiving, during the current pass of the test program, a user-specified key seed value and setting the key seed to the user-specified key seed value. The method additionally includes setting, during the current pass of the test program, the data seed to the user-specified key seed value; generating one or more data keys based at least in part on the data seed having the user-specified key seed value; and resetting the data seed to the stored data seed value.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments relate to, among other things, systems, methods, computer-readable media, techniques, and methodologies for providing a test program with the capability to build and execute instructions and their functions (test streams) that have experienced failure so as to reproduce output errors as desired and improve the likelihood of determining the cause of the output errors. Example embodiments of the invention thus provide an enhanced data key generation process for detecting, for example, the destruction of output data of cryptographic encrypted key operations.

In example embodiments, a test program is provided that allows a user to provide a data key seed that was used in connection with a prior pass of the test program that produced an error output and a data key generation frequency value (N) that would be used to generate new program and data seeds every N passes of the test program. A pass of a test program, as used herein, refers to execution of a test stream that includes one or more test cases. During a pass of the test program, new random number program and data seeds are generated, and the generated random program and data seeds are saved. After the data key generation process completes, the saved random data seed is restored as the data seed and is used by subsequent random number data generation of the test program.

In accordance with example embodiments, if, during a current pass of the test program, a user enters a data key seed value that was used to produce an error output in connection with a prior pass of the test program, then this user-specified data key seed value is used (in lieu of the random data seed generated during the current pass) to regenerate the same data keys that were generated in the prior test program pass that produced the error output. This mechanism enables the test program to recreate the same test stream of the error output from the prior pass. Also, the user-specified data seed value that is passed to the test program during the current pass is saved as a used data seed and can be reused for one or more subsequent test program passes.

In accordance with example embodiments, if the user does not provide a key seed value, the test program checks to see if a new data seed generated for the current test program pass or a data seed from the previous test program pass should be used for the current pass. If this is an initial pass of the test program, or the current test program pass is one more than a multiple of the data key generation frequency value N and the test program is not looping on a particular test program pass, then the random data seed generated during the current test program pass is used to generate one or more new random number data keys for the current test program pass. Also, the generated random data seed is saved as a used data seed to allow for reuse in a subsequent program pass. If, on the other hand, none of the above conditions are satisfied, the data seed from the previous program pass is used as the data seed to regenerate, for the current program pass, the same data keys that were generated in the previous pass.

As such, in example embodiments, there are three different paths for selecting the data seed to be used for generating one or more data keys during a particular program pass. A first selection path would utilize a key seed value provided by a user as the data seed for a current pass of the test program; a second selection path would utilize the random data seed that is generated during the current pass; and a third selection path would utilize the data seed from the previous program pass. Regardless of which selection path is taken, which in turn, determines the value that is used as the data seed for a current test program pass (e.g., a user-specified key seed value, a random generated data seed, or a data seed from the previous program pass), the random data seed generated for the current pass is stored and restored as the data seed to allow for its reuse in a subsequent program pass.

Example embodiments described herein provide a number of technical effects, benefits, and improvements to conventional test stream generation processes, in particular, test stream generation processes associated with the detection of output errors of cryptographic encrypted key operations. Example embodiments enable a test program to reproduce the error output associated with execution of a test stream by utilizing a same data seed that produced the error output. In particular, according to example embodiments, the used data seed value of a current program pass is printed in the program error output (if an error occurs in this program pass) such that the used data seed value can be extracted from the error output and used to reproduce the same error with the same data key in the future. Via this mechanism, a test stream that produced an error output can be repeatedly executed to reproduce the error and increase the likelihood of detecting the cause of the error output. Conventional test stream generation processes lack this technical capability of example embodiments to reproduce error output by reusing a used data seed value from a prior program pass. This technical capability of example embodiments produces a technical benefit over conventional test stream generation processes because it is more efficient (e.g., requires less amount of time and/or less processing resources) at identifying the cause of failure than such conventional processes.

In addition, the generation of a random data seed, the save and restore mechanism for the data seed, and the selection of one of the three distinct selection paths according to example embodiments ensures that the data key generation process utilizes the appropriate data seed value and that any random data generation that occurs before and after the data key generation process utilizes the appropriate data seed value (these values may be different depending on the selection path). This ensures that the error reproducibility capability can be provided without altering the random data generation that may occur during execution of a test stream and prior to or after the data key generation. For instance, the save and restore mechanism for the data seed ensures that the correct random data is generated prior to and after the data key generation even if a different data seed is used for the data key generation. This also represents a technical benefit and effect over conventional test stream generation processes because such conventional processes lack the reproducibility capability with respect to test cases that require data key generation (e.g., cryptographic instructions), and thus, necessarily lack a save and restore mechanism that ensures that random data generation that occurs before and after the data key generation utilizes the appropriate data seed.

The technical benefits, technical effects, and technical improvements of example embodiments described above together constitute an improvement to computer technology—specifically an improvement to computer-based test stream generation technology. In particular, the error output reproducibility capability and the save and restore mechanism for the random generated data seed, for instance, improve the functioning of a computer that is configured to execute a test program that includes multiple test streams, one or more of which include test case(s) with cryptographic instructions.

Various illustrative methods and corresponding data structures associated therewith will now be described. It should be noted that any given operation of any of the methods 200-400 may be performed by one or more of the program modules or the like depicted in FIG. 1 or 5, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 1:
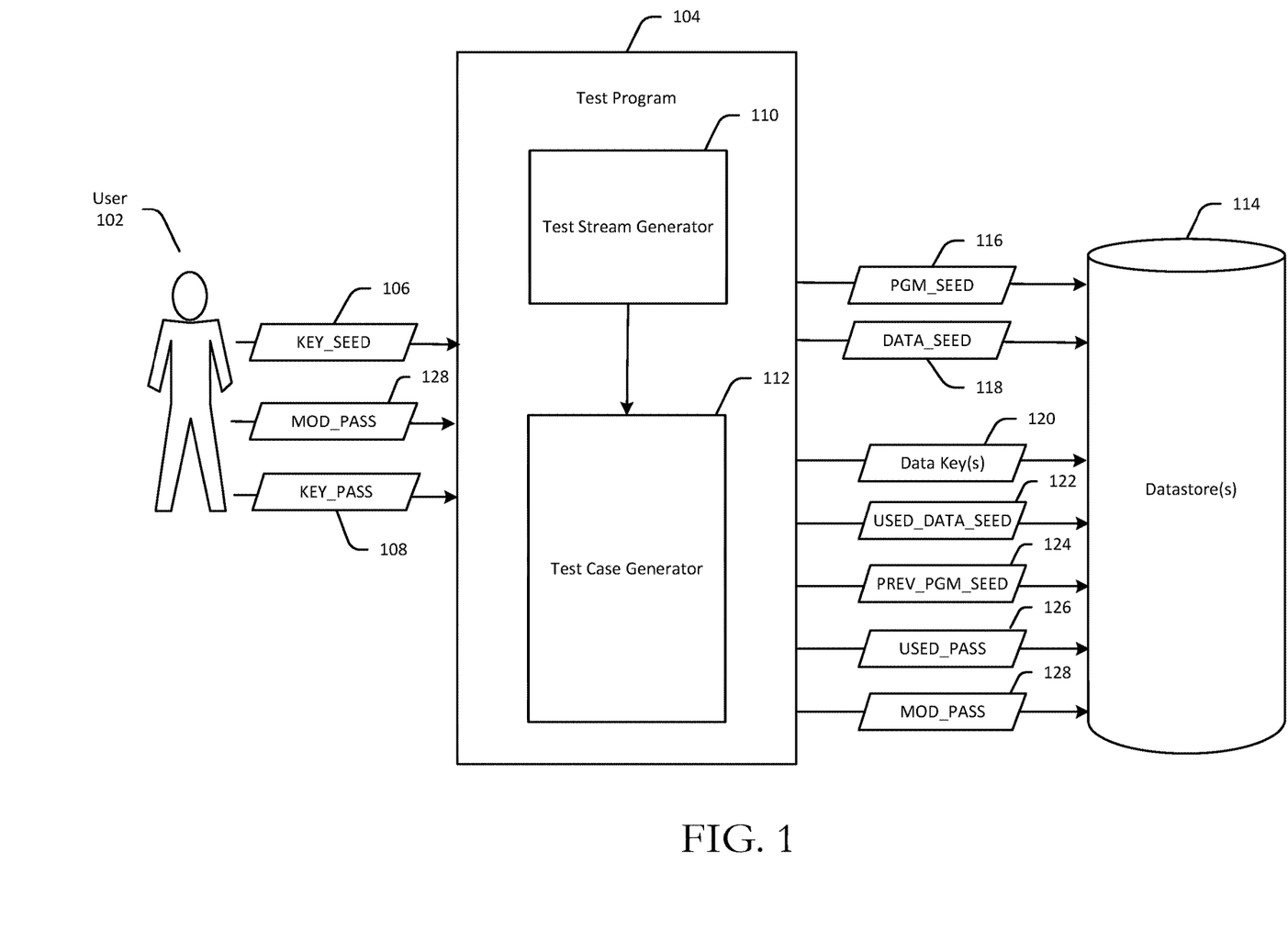
FIG. 1 is a schematic hybrid data flow/block diagram illustrating data key generation during execution of a test program in accordance with example embodiments.
Figure 2:
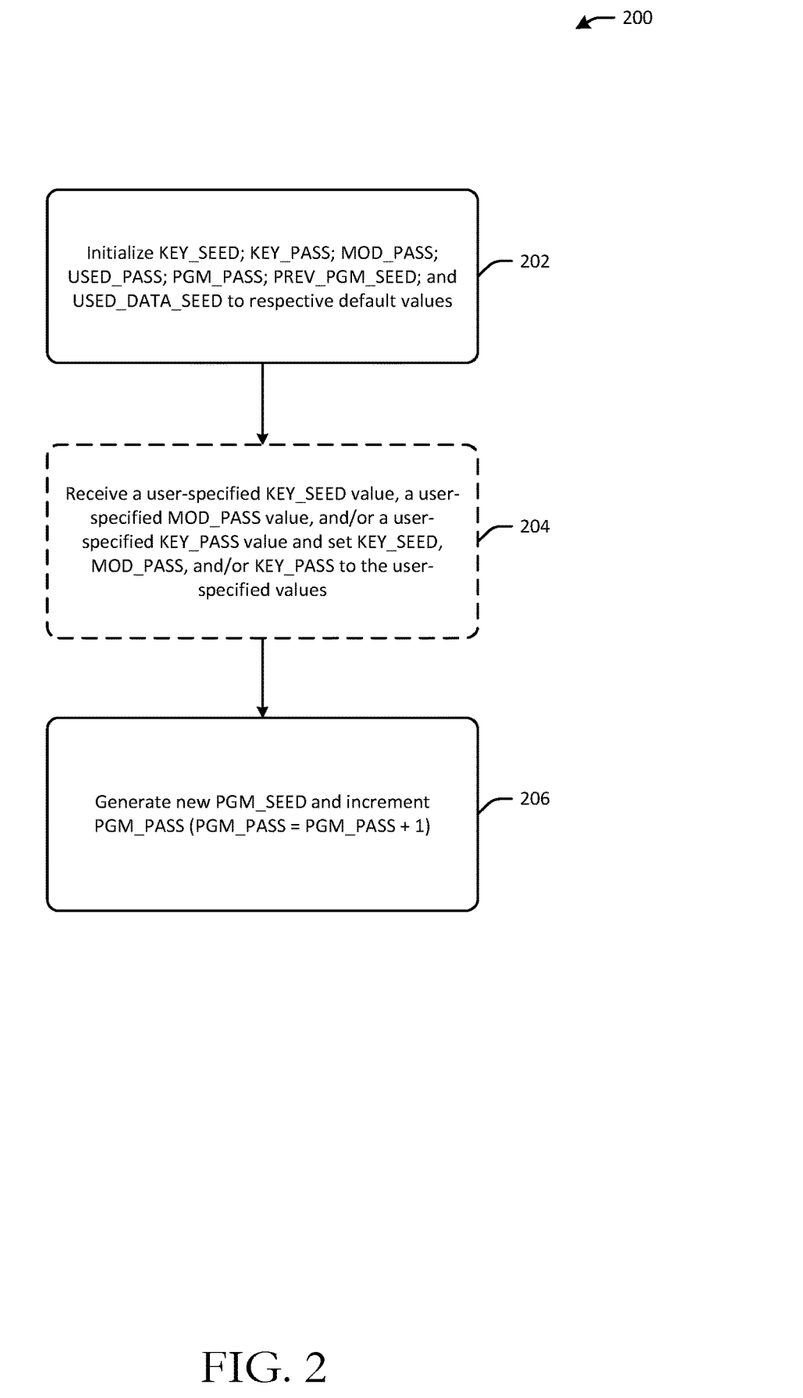
FIG. 2 is a process flow diagram of an illustrative method for initializing a set of data key generation variables for a particular pass of a test program in accordance with example embodiments.
Figure 3A:
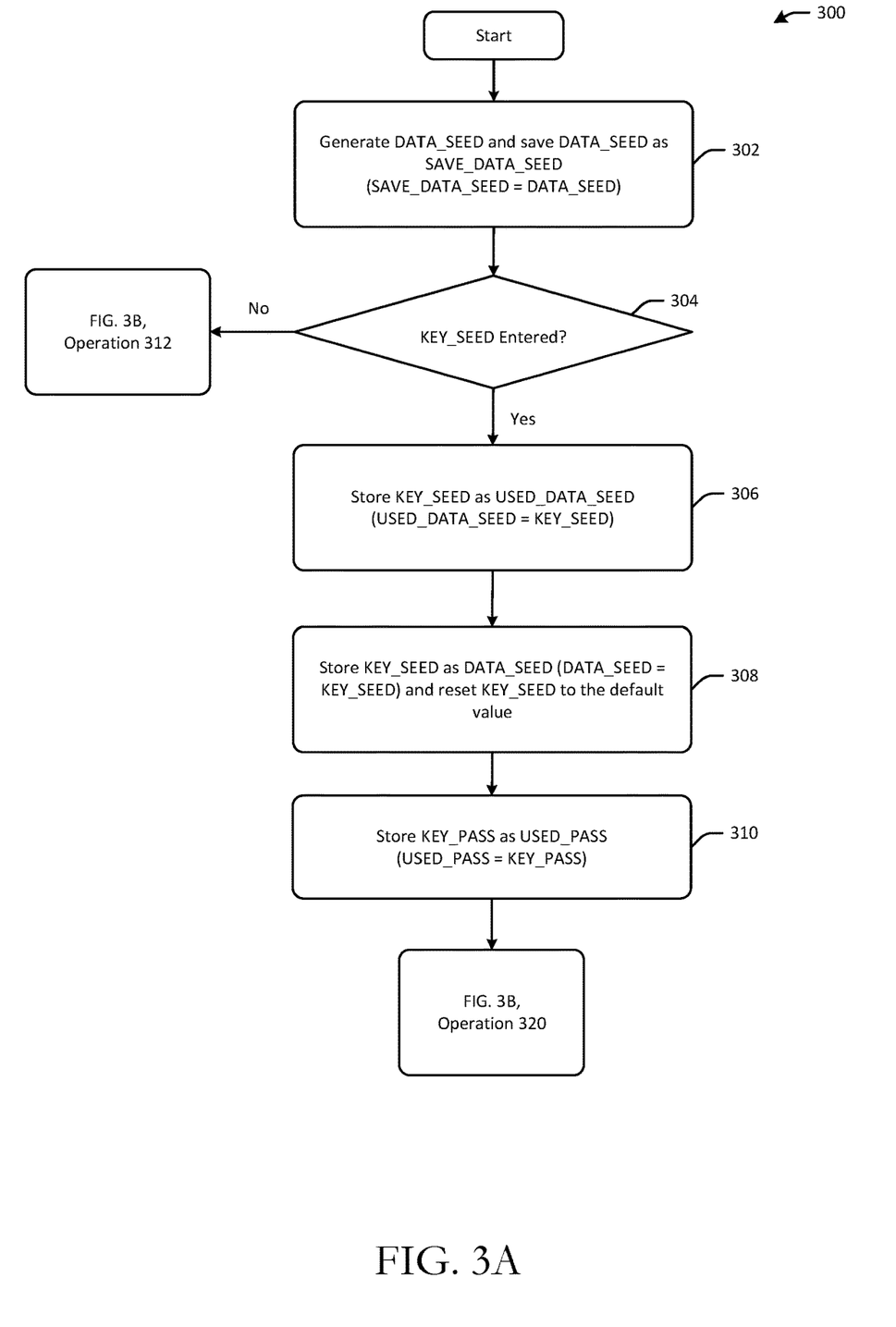
FIGS. 3A and 3B are process flow diagrams of an illustrative method for data key generation during execution of a test program in accordance with one or more example embodiments.
Figure 3B:
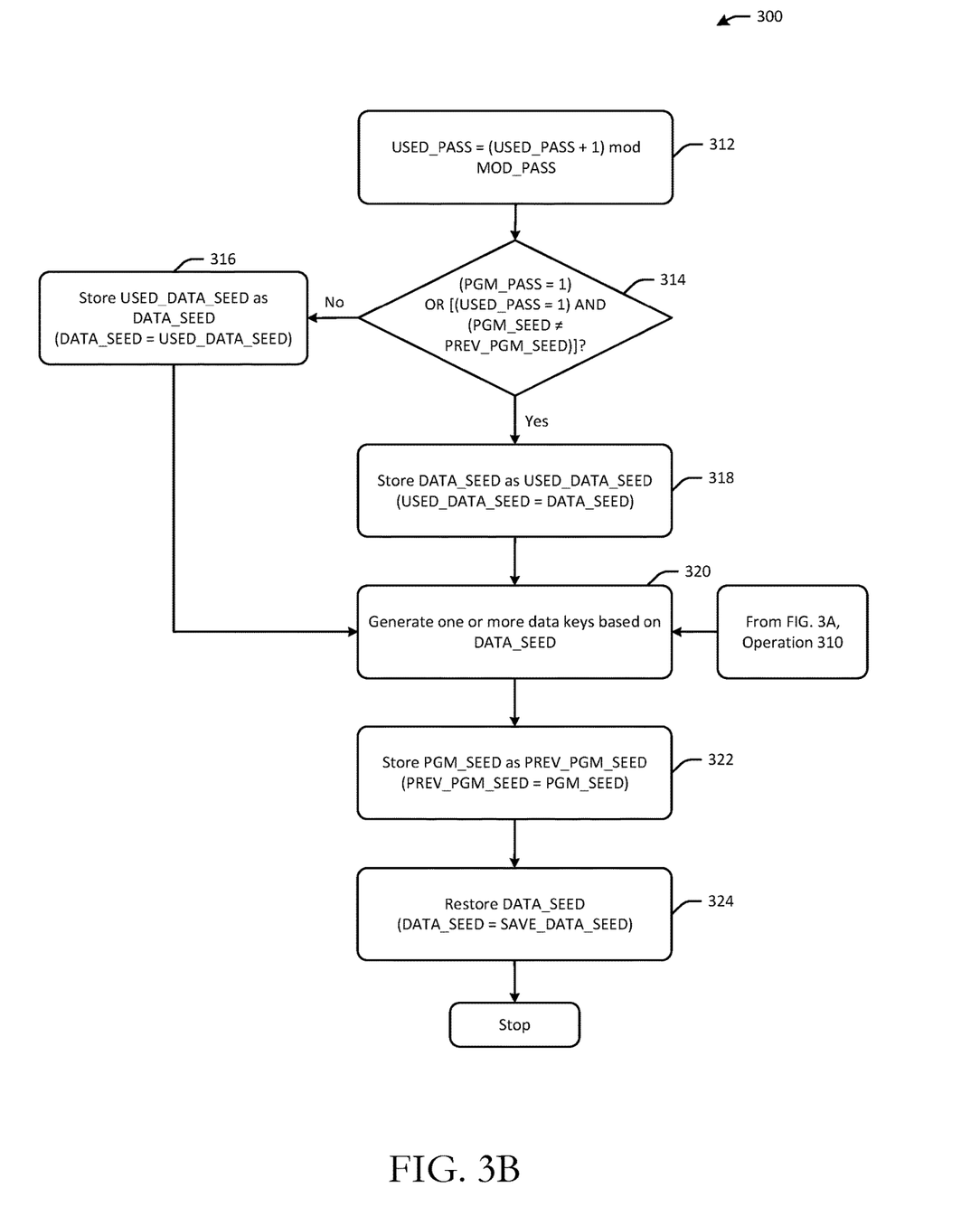
Figure 4:
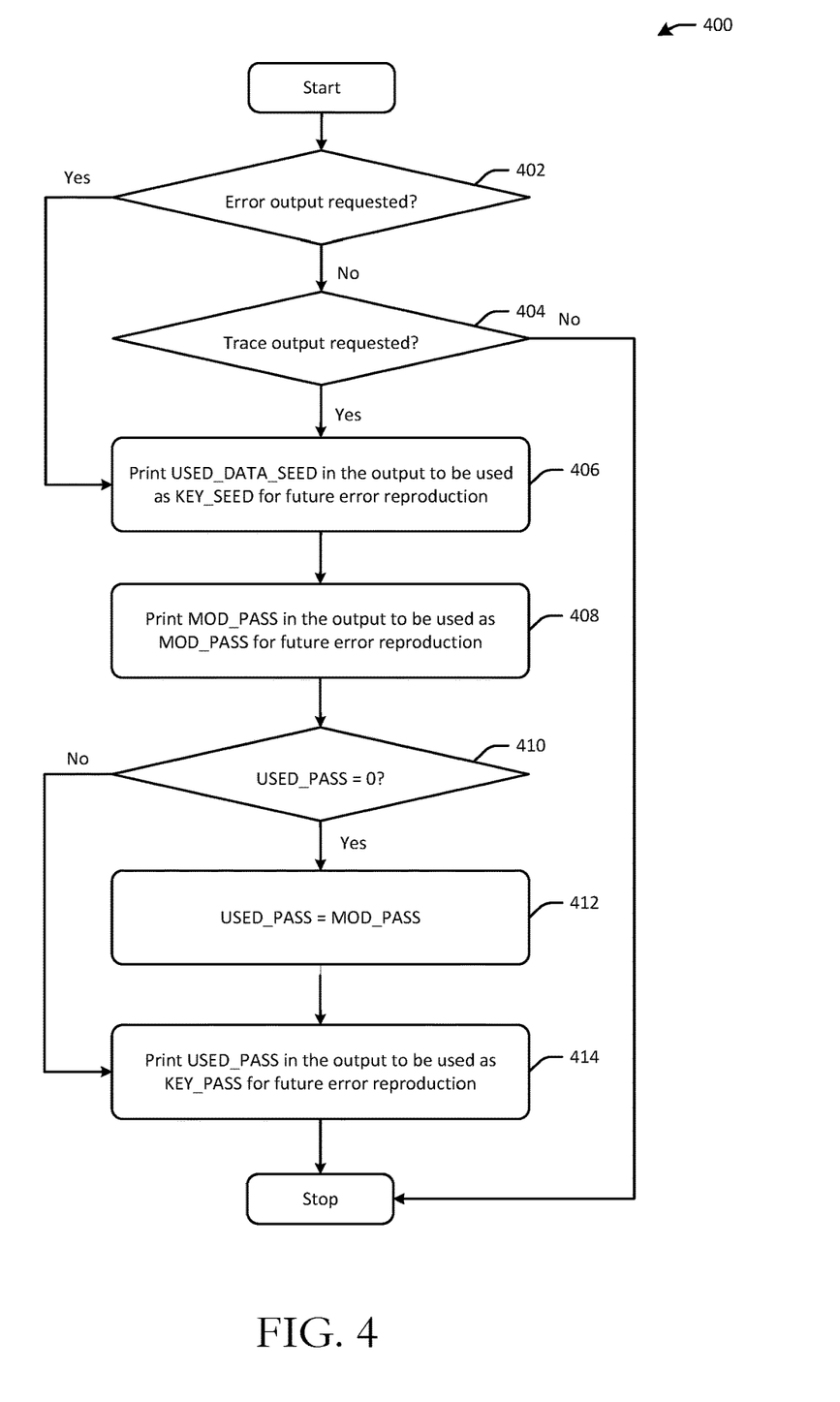
FIG. 4 is a process flow diagram of an illustrative method for outputting data key generation variables for future error reproduction in accordance with one or more example embodiments.

FIG. 1 is a schematic hybrid data flow/block diagram illustrating data key generation during execution of a test program in accordance with example embodiments. FIG. 2 is a process flow diagram of an illustrative method 200 for initializing a set of data key generation variables for a particular pass of a test program in accordance with example embodiments. FIGS. 3A and 3B are process flow diagrams of an illustrative method 300 for data key generation during execution of a test program in accordance with one or more example embodiments. FIG. 4 is a process flow diagram of an illustrative method 400 for outputting data key generation variables for future error reproduction in accordance with one or more example embodiments. Each of FIGS. 2, 3A, 3B, and 4 will be described in conjunction with FIG. 1 hereinafter.

Referring first to FIG. 2 in conjunction with FIG. 1, in accordance with example embodiments, at block 202 of the method 200, various data key generation variables are initialized to respective default values. For instance, a data key seed (KEY_SEED 106) is initialized to a default value of zero. A data key generation frequency value (MOD_PASS 128)—which would be used to generate a new program seed every MOD_PASS 108 value number of passes (e.g., test streams) of a test program 104—is initialized to a default positive non-zero integer value in example embodiments. In addition, a parameter (KEY_PASS 108) indicative of a current pass of the test program 104 is also initialized to a default positive non-zero integer value in example embodiments. In certain example embodiments, KEY_PASS 108 may indicate the particular pass of the test program 104 that is being looped through.

Further, in example embodiments, additional data key generation variables are initialized at block 202 including a program pass counter/test stream counter (PGM_PASS) that keeps track of the number of passes of the test program 104 that have been executed; a parameter (USED_PASS 126) that ensures that a new program seed is generated every MOD_PASS 128 number of passes of the test program 104 starting from an initial pass regardless of which pass of the test program 104 an error output may occur at; a parameter indicative of a program seed associated with a prior program pass (PREV_PGM_SEED 124); and a parameter indicative of a data seed used during the previous program pass (USED_DATA_SEED 122). In example embodiments, PGM_PASS, USED_PASS 126, PREV_PGM_SEED 124, and USED_DATA_SEED 122 are each initialized to a default value of zero.

In example embodiments, during a current pass of the test program 104, a user 102 optionally passes a KEY_SEED value to the test program 104 from the error output of a prior pass of the test program 104. This user-specified KEY_SEED value is received and KEY_SEED 106 is set to this user-specified value at block 204 of the method 200. In example embodiments, the user-specified KEY_SEED value was used to generate data keys during a prior pass of the test program 104. In addition, in example embodiments, the user 102 optionally passes a data key generation frequency (MOD_PASS) value—which would be used to generate a new program seed every MOD_PASS value number of passes of the test program 104 from the initial pass—and/or a KEY_PASS value which may be the value of USED_PASS 126 extracted from the error output of a prior pass of the test program 104. In example embodiments, these values are received at block 204 as well and the corresponding parameters MOD_PASS 128 and KEY_PASS 108 are set to these respective values. If, for example, a MOD_PASS value of 10 is received, then a new random number program seed would be generated every 10 passes (test streams) of the test program 104 from the initial pass. If, for example, a KEY_PASS value of 4 is received, this would indicate that the error output of pass 4 of the test program 104 is being reproduced. As previously noted, the default values and ranges of KEY_PASS 108 and MOD_PASS 128 fall within the set of positive non-zero integers. In example embodiments, if the user 102 attempts to pass zero or negative MOD_PASS and/or KEY_PASS values to the test program 104, an error message is displayed and the user 102 is prompted to provide appropriate values.

At block 206 of the method 200, the test program 104 generates a new random number program seed PGM_SEED 116 and increments PGM_PASS by one (PGM_PASS=PGM_PASS+1) to indicate a new pass of the test program 104 has been initiated. The new PGM_SEED 116 generated for each pass of the test program 104 is stored in one or more datastores 114. In example embodiments, for each program pass, the test program 104 generates a new test stream with one or more test cases, executes the test stream on the target machine, simulates the test stream results, compares the test stream results of the machine and the simulator, and prints detailed error output if the results comparison fails. More specifically, for each program pass, a test stream generator 110 of the test program 104 generates a new test stream containing one or more test cases generated by a test case generator 112 of the test program 104.

Referring now to FIG. 3A in conjunction with FIG. 1, at block 302 of the method 300, the test program 104 generates, for a current pass of the test program 104, a random DATA_SEED 118 and saves the random generated data seed value in a SAVE_DATA_SEED parameter (SAVE_DATA_SEED=DATA_SEED). Saving the data seed value generated for the current program pass in SAVE_DATA_SEED allows for this value to be restored at the end of the data key generation process. This save and restore mechanism is needed in order for the random data generation based on the current data seed (DATA_SEED 118) that comes after this data key generation process to work properly if regeneration of the same random data is needed in the future.

At block 304 of the method 300, the test program 104 determines whether a user has entered as KEY_SEED value. In certain example embodiments, a positive determination is made at block 304 if KEY_SEED 106 is non-zero. In response to a positive determination at block 304, that is, if the user 102 has entered, in the current program pass, the data key seed value (KEY_SEED 106) from an error output of a prior program pass, then the user-specified data key seed value (KEY_SEED 106) is saved as USED_DATA_SEED 122 (USED_DATA_SEED=KEY_SEED) at block 306 of the method 300 for possible use in the next program pass.

At block 308 of the method 300, DATA_SEED 118 is set to the user-specified data key seed value (KEY_SEED 106) for the current program pass (DATA_SEED=KEY_SEED) to enable generation of one or more data keys 120 from KEY_SEED 106 for the current program pass. Further, at block 308, the user-specified data key seed value (KEY_SEED 106) is reset to zero to prevent reuse of this data key seed in the next program pass. At block 310 of the method 300, USED_PASS 126 is set to the KEY_PASS 108 value. As previously noted, in certain example embodiments, KEY_PASS 108 is the value of USED_PASS 126 extracted from the error output of a prior pass of the test program 104. If, for example, a KEY_PASS 108 value of 4 is received by the test program 104, this would indicate that the error output of pass 4 of the test program 104 is being reproduced, and USED_PASS 126 would be set to the value 4. From block 310, the method 300 proceeds to block 320, where DATA_SEED 118 (which has been set to the user-specified key seed value KEY_SEED 106) is used to generate the one or more data keys 120, which would be the same data keys generated during a prior program pass that utilized KEY_SEED 106 and produced an error output.

Referring again to block 304, if, on the other hand, the user 102 has not passed a KEY_SEED value to the test program 104 from a prior program pass, the method 300 proceeds to block 312. Referring now to FIG. 3B, at block 312 of the method 300, USED_PASS 126 is incremented by one and the modulus of this incremented value with respect to MOD_PASS 128 is determined and stored in USED_PASS 128 (USED_PASS=(USED_PASS+1) mod MOD_PASS).

At block 314 of the method 300, the test program 104 performs a check to determine if the new data seed (DATA_SEED 118) needs to be generated for the current program pass or the data seed from the previous program pass (USED_DATA_SEED 122) should be used to generate the one or more data keys 120 for the current program pass. In particular, at block 314, the test program 104 determines whether the current pass is the initial pass of the test program 104 (PGM_PASS=1) or the current pass is a multiple of the MOD_PASS 128 value plus one (USED_PASS=1) and the test program is not looping on the current program seed, that is, the PGM_SEED 116 value is different from the PREV_PGM_SEED 124 value (PGM_SEED≠PREV_PGM_SEED). If PGM_PASS=1 OR [(USED_PASS=1) AND (PGM_SEED≠PREV_PGM_SEED)], a positive determination is made at block 314, and the current random data seed (DATA_SEED 118) is saved as USED_DATA_SEED 122 (USED_DATA_SEED=DATA_SEED) and used, at block 320 of the method 300, to generate the data key(s) 120 for the current program pass. Saving DATA_SEED 118 as USED_DATA_SEED 122 allows for reuse of the DATA_SEED 118 to generate the same data key(s) in a subsequent program pass.

If, on the other hand, any of the following conditions are satisfied: i) the current pass is not the initial pass (PGM_PASS≠1), ii) the current pass is not a multiple of the MOD_PASS 128 value plus one (USED_PASS≠1), or iii) the test program 104 is looping on the current program seed (PGM_SEED=PREV_PGM_SEED), then a negative determination is made at block 314 and new data keys are not generated. Rather, the data seed from the previous program pass (USED_DATA_SEED) is loaded into DATA_SEED 118 at block 316 of the method 300 and used, at block 320, as the data key seed to regenerate, for the current program pass, the same data keys that were generated in the previous program pass (DATA_SEED=USED_DATA_SEED). This reuse mechanism ensures regeneration, in the current program pass, of the same data keys that were generated in the previous program pass.

Thus, at block 320, the test program 104 generates one or more random number data keys 120 for the current program pass using the data seed that was selected by one of the three alternative selection paths described above and that is currently stored in DATA_SEED 118 for the current program pass. In particular, the data seed used at block 320 may be a KEY_SEED 106 passed to the test program 104 by the user 102; the USED_DATA_SEED from the previous program pass; or the random data seed generated for the current program pass.

At block 322 of the method 300, the test program 104 saves the current program seed (PGM_SEED 116) into the PREV_PGM_SEED 124 parameter (PREV_PGM_SEED=PGM_SEED). In example embodiments, PREV_PGM_SEED 124 is used in the next program pass to determine if the test program 104 is looping on the same program seed. In addition, at block 324 of the method 300, the test program restores the generated random data seed that was saved at the beginning of the data key generation process (SAVE_DATA_SEED) as the current data seed (DATA_SEED 118) (DATA_SEED=SAVE_DATA_SEED). This save and restore mechanism ensures that random data generation based on the current data seed that comes after this data key generation process continues to work properly if regeneration of the same random data is needed in the future.

In example embodiments, if an error is later detected by the test program 104, the USED_DATA_SEED 122 value for the current program pass will be printed in the program error output (if an error occurred in this program pass). The user 102 can then extract the USED_DATA_SEED 122 value from the error output and use it to reproduce the same error with the same data key in the future (i.e., by entering the USED_DATA_SEED 122 value as the KEY_SEED 106). This process will be described in more detail hereinafter in reference to FIG. 4.

At block 402 of the method 400, the test program 104 determines if an error output has been requested. In response to a negative determination at block 402, the method 400 proceeds to block 404, where the test program 104 determines if a trace output has been requested. In response to negative determination at block 404 as well, the method 400 ends. On the other hand, in response to a positive determination at block 402 or block 404, the method 400 proceeds to block 406, where the test program 104 prints the USED_DATA_SEED 122 value in the output for the current program pass to enable its use as KEY_SEED 106 for error reproduction in a future program pass.

From block 406, the method 400 proceeds to block 408, where the test program 104 also prints the MOD_PASS 128 value in the error output to allow for its use as MOD_PASS 128 for error reproduction in a future program pass. At block 410 of the method 400, the test program 104 determines whether USED_PASS 122 is equal to zero. In response to a positive determination at block 410, USED_PASS 122 is set the value of MOD_PASS 128. The operation at block 412 is performed to ensure that a meaningful value is printed to identify the program pass that produced the error output. In particular, in the example of FIG. 4, the USED_PASS 122 parameter ranges from 0 to 9, but a value of 0 for USED_PASS 122 actually represents the value of the data key generation frequency parameter MOD_PASS 128. Thus, USED_PASS 122 is set to MOD_PASS 128 at block 412 so that the correct program pass is identified. From block 412, as well as in response to a negative determination at block 410, the method 400 proceeds to block 414, where the test program 104 prints USED_PASS 122 in the output so that the user 102, for example, can provide the USED_PASS 122 value as the KEY_PASS 106 value for error reproduction in a future program pass.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure. For example, the data key generation process described herein in accordance with example embodiments can be expanded to use multiple data seeds to produce one set of unique and reproducible data for each data seed.

Figure 5:
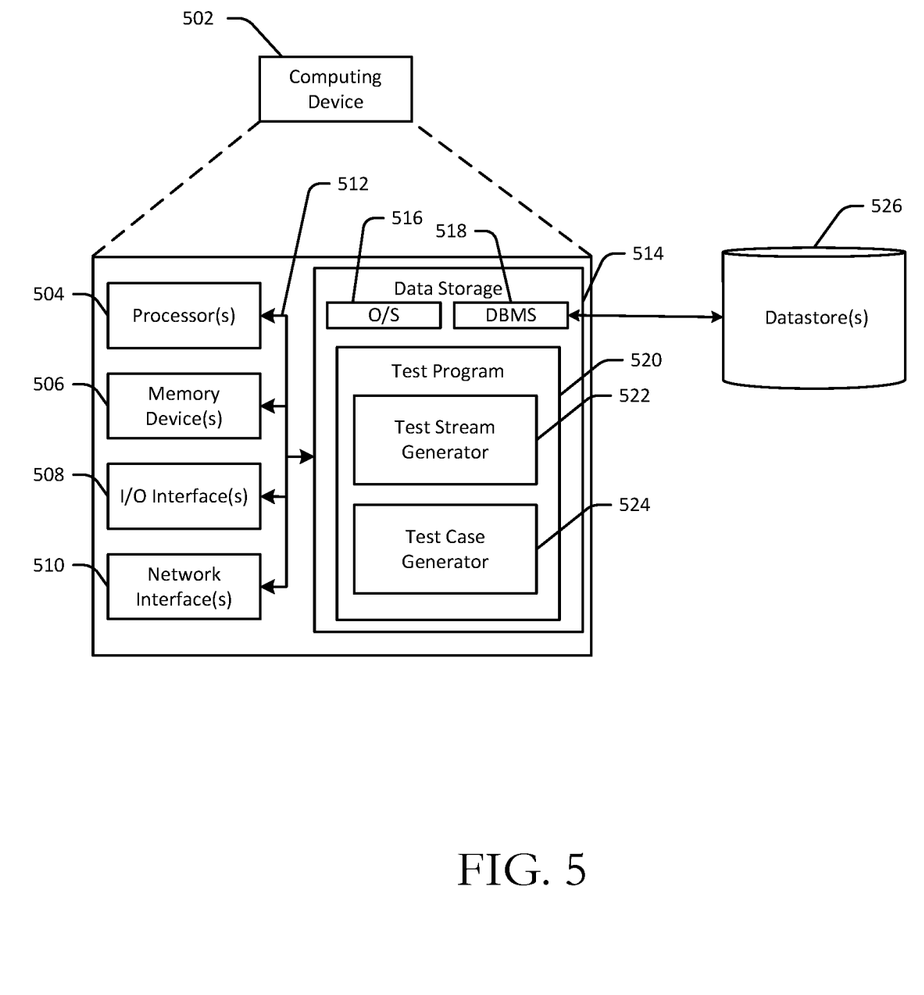
FIG. 5 is a schematic diagram of an illustrative computing device configured to implement one or more example embodiments.

FIG. 5 is a schematic diagram of an illustrative computing device 502 configured to implement one or more example embodiments of the disclosure. The computing device 502 may be any suitable device including, without limitation, a server, a personal computer (PC), a tablet, a smartphone, a wearable device, a voice-enabled device, or the like. While any particular component of the computing device 502 may be described herein in the singular, it should be appreciated that multiple instances of any such component may be provided, and functionality described in connection with a particular component may be distributed across multiple ones of such a component.

Although not depicted in FIG. 5, the computing device 502 may be configured to communicate with one or more other devices, systems, datastores, or the like via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 502 may include one or more processors (processor(s)) 504, one or more memory devices 506 (generically referred to herein as memory 506), one or more input/output ("I/O") interface(s) 508, one or more network interfaces 510, and data storage 514. The computing device 502 may further include one or more buses 512 that functionally couple various components of the computing device 502.

The bus(es) 512 may include at least one of a system bus, a memory bus, an address bus, a message bus, and may permit the exchange of information (e.g., data (including computer-executable code), signaling, etc.) between various components of the computing device 502. The bus(es) 512 may include, without limitation, a memory bus or a memory controller, a peripheral bus, an accelerated graphics port, and so forth. The bus(es) 512 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 506 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 506 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 506 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 514 may include removable storage and/or non-removable storage including, but not limited to, magnetic storage, optical disk storage, and/or tape storage. The data storage 514 may provide non-volatile storage of computer-executable instructions and other data. The memory 506 and the data storage 514, removable and/or non-removable, are examples of computer-readable storage media (CRSM) as that term is used herein.

The data storage 514 may store computer-executable code, instructions, or the like that may be loadable into the memory 506 and executable by the processor(s) 504 to cause the processor(s) 504 to perform or initiate various operations. The data storage 514 may additionally store data that may be copied to memory 506 for use by the processor(s) 504 during the execution of the computer-executable instructions. Moreover, output data generated as a result of execution of the computer-executable instructions by the processor(s) 504 may be stored initially in memory 506 and may ultimately be copied to data storage 514 for non-volatile storage.

More specifically, the data storage 514 may store one or more operating systems (O/S) 516; one or more database management systems (DBMS) 518 configured to access the memory 506 and/or one or more external datastores 526; and one or more program modules, applications, engines, managers, computer-executable code, scripts, or the like such as, for example, a test stream generator 520, a test case generator 522, and an exception test case generator 524. Any of the components depicted as being stored in data storage 514 may include any combination of software, firmware, and/or hardware. The software and/or firmware may include computer-executable instructions (e.g., computer-executable program code) that may be loaded into the memory 506 for execution by one or more of the processor(s) 504 to perform any of the operations described earlier in connection with correspondingly named modules.

Although not depicted in FIG. 5, the data storage 514 may further store various types of data utilized by components of the computing device 502 (e.g., data stored in the datastore(s) 526). Any data stored in the data storage 514 may be loaded into the memory 506 for use by the processor(s) 504 in executing computer-executable instructions. In addition, any data stored in the data storage 514 may potentially be stored in the external datastore(s) 526 and may be accessed via the DBMS 518 and loaded in the memory 506 for use by the processor(s) 504 in executing computer-executable instructions.

The processor(s) 504 may be configured to access the memory 506 and execute computer-executable instructions loaded therein. For example, the processor(s) 504 may be configured to execute computer-executable instructions of the various program modules, applications, engines, managers, or the like of the computing device 502 to cause or facilitate various operations to be performed in accordance with one or more embodiments of the disclosure. The processor(s) 504 may include any suitable processing unit capable of accepting data as input, processing the input data in accordance with stored computer-executable instructions, and generating output data. The processor(s) 504 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 504 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 504 may be capable of supporting any of a variety of instruction sets.

Referring now to other illustrative components depicted as being stored in the data storage 514, the O/S 516 may be loaded from the data storage 514 into the memory 506 and may provide an interface between other application software executing on the computing device 502 and hardware resources of the computing device 502. More specifically, the O/S 516 may include a set of computer-executable instructions for managing hardware resources of the computing device 502 and for providing common services to other application programs. In certain example embodiments, the O/S 516 may include or otherwise control the execution of one or more of the program modules, engines, managers, or the like depicted as being stored in the data storage 514. The O/S 516 may include any operating system now known or which may be developed in the future including, but not limited to, any server operating system, any mainframe operating system, or any other proprietary or non-proprietary operating system.

The DBMS 518 may be loaded into the memory 506 and may support functionality for accessing, retrieving, storing, and/or manipulating data stored in the memory 506, data stored in the data storage 514, and/or data stored in external datastore(s) 526. The DBMS 518 may use any of a variety of database models (e.g., relational model, object model, etc.) and may support any of a variety of query languages. The DBMS 518 may access data represented in one or more data schemas and stored in any suitable data repository. The datastore(s) 526 may include datastore(s) 114. As such, data stored in the datastore(s) 526 may include, for example, the instructions 116, VALID_FC_ARRAYs 118 corresponding to the instructions 116, BYPASS_FC_ARRAYs, BYPASS_FC_MASKs, test cases, exception test cases, and so forth. External datastore(s) 526 that may be accessible by the computing device 502 via the DBMS 518 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 502, the input/output (I/O) interface(s) 508 may facilitate the receipt of input information by the computing device 502 from one or more I/O devices as well as the output of information from the computing device 502 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 502 or may be separate. The I/O devices may further include, for example, any number of peripheral devices such as data storage devices, printing devices, and so forth.

The I/O interface(s) 508 may also include an interface for an external peripheral device connection such as universal serial bus (USB), FireWire, Thunderbolt, Ethernet port or other connection protocol that may connect to one or more networks. The I/O interface(s) 508 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 502 may further include one or more network interfaces 510 via which the computing device 502 may communicate with any of a variety of other systems, platforms, networks, devices, and so forth. The network interface(s) 510 may enable communication, for example, with one or more other devices via one or more of the network(s).

It should be appreciated that the program modules/engines depicted in FIG. 5 as being stored in the data storage 514 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 502 and/or other computing devices accessible via one or more networks, may be provided to support functionality provided by the modules depicted in FIG. 5 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 5 may be implemented, at least partially, in hardware and/or firmware across any number of devices.

It should further be appreciated that the computing device 502 may include alternate and/or additional hardware, software, or firmware components beyond those described or depicted without departing from the scope of the disclosure. More particularly, it should be appreciated that software, firmware, or hardware components depicted as forming part of the computing device 502 are merely illustrative and that some components may not be present or additional components may be provided in various embodiments. While various illustrative modules have been depicted and described as software modules stored in data storage 514, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of any of the methods 200-400 may be performed by a computing device 502 having the illustrative configuration depicted in FIG. 5, or more specifically, by one or more program modules, engines, applications, or the like executable on such a device. It should be appreciated, however, that such operations may be implemented in connection with numerous other device configurations.

The operations described and depicted in the illustrative methods of FIGS. 2-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for data key generation during execution of a test program, the method comprising:
    initializing, in connection with an initial pass of the test program, a key seed to a first default value; and
    during a current pass of the test program:
        generating a data seed having a data seed value;
        storing the data seed value;
        receiving a user-specified key seed value;
        setting the key seed to the user-specified key seed value;
        setting the data seed to the user-specified key seed value;
        generating one or more data keys based at least in part on the data seed having the user-specified key seed value; and
        resetting the data seed to the stored data seed value.

2. The computer-implemented method of claim 1, wherein the current pass of the test program comprises executing a particular test stream of the test program, the method further comprising storing, during the current pass of the test program, the user-specified key seed value as a used data seed value for use in connection with repeated execution of the particular test stream or execution of one or more subsequent test streams.

3. The computer-implemented method of claim 2, further comprising:
    initializing, in connection with the initial pass of the test program, a mod pass parameter to a first value, a key pass parameter to a second value, and a used pass parameter to a third value;
    initializing, in connection with the initial pass of the test program, a program pass counter to zero; and
    during the current pass of the test program:
        incrementing the program pass counter by one;
        generating a program seed having a program seed value; and
        storing the program seed value.

4. The computer-implemented method of claim 3, wherein the one or more data keys is a first one or more data keys, and wherein the user-specified key seed value is used to generate a second one or more data keys during a pass of the test program that is prior to the current pass and that resulted in an error output, the method further comprising during the current pass of the test program:
    setting the key pass parameter to a value of the used pass parameter from the prior pass of the test program; and
    setting the used pass parameter to the value of the key pass parameter.

5. The computer-implemented method of claim 4, wherein the data seed is a first data seed, the data seed value is a first data seed value, and the current pass is a first pass of the test program, the method further comprising during a second pass of the test program:
    generating a second data seed having a second data seed value;
    overwriting the stored first data seed value from the first pass of the test program with the second data seed value;
    determining that no user-specified key seed value has been provided;

determining a new value for the used pass parameter, wherein the new value for the used pass parameter is a modular value of the value of the used pass parameter incremented by one with respect to the first value of the mod pass parameter; and setting the used pass parameter to the new value.

6. The computer-implemented method of claim 5, further comprising during the second pass of the test program:

determining one of: i) the program pass counter is equal to one or ii) the new value of the used pass parameter is equal to one and the stored program seed value from the first pass of the test program does not equal a program seed value associated with the second pass of the test program; and generating a third one or more data keys based at least in part on the second data seed having the second data seed value in lieu of the used data seed value from the first pass of the test program.

7. The computer-implemented method of claim 5, further comprising during the second pass of the test program:

determining i) the program pass counter is not equal to one and ii) the new value of the used pass parameter is not equal to one or the stored program seed value from the first pass of the test program equals a program seed value associated with the second pass of the test program; and generating a third one or more data keys based at least in part on the used data seed value from the first pass of the test program.

8. A system for data key generation during execution of a test program, the system comprising:

at least one memory storing computer-executable instructions; and at least one processor of a sending device, wherein the at least one processor is configured to access the at least one memory and execute the computer-executable instructions to:

initialize, in connection with an initial pass of the test program, a key seed to a first default value; and during a current pass of the test program:
generate a data seed having a data seed value;
store the data seed value;
receive a user-specified key seed value;
set the key seed to the user-specified key seed value;
set the data seed to the user-specified key seed value;
generate one or more data keys based at least in part on the data seed having the user-specified key seed value; and
reset the data seed to the stored data seed value.

9. The system of claim 8, wherein the current pass of the test program comprises executing a particular test stream of the test program, and wherein the at least one processor is further configured to execute the computer-executable instructions to store, during the current pass of the test program, the user-specified key seed value as a used data seed value for use in connection with repeated execution of the particular test stream or execution of one or more subsequent test streams.

10. The system of claim 9, wherein the at least one processor is further configured to execute the computer-executable instructions to:

initialize, in connection with the initial pass of the test program, a mod pass parameter to a first value, a key pass parameter to a second value, and a used pass parameter to a third value;

initialize, in connection with the initial pass of the test program, a program pass counter to zero; and during the current pass of the test program:
increment the program pass counter by one;
generate a program seed having a program seed value; and
store the program seed value.

11. The system of claim 10, wherein the one or more data keys is a first one or more data keys, wherein the user-specified key seed value is used to generate a second one or more data keys during a pass of the test program that is prior to the current pass and that resulted in an error output, and wherein the at least one processor is further configured to execute the computer-executable instructions during the current pass of the test program to:

set the key pass parameter to a value of the used pass parameter from the prior pass of the test program; and set the used pass parameter to the value of the key pass parameter.

12. The system of claim 11, wherein the data seed is a first data seed, the data seed value is a first data seed value, and the current pass is a first pass of the test program, and wherein the at least one processor is further configured to execute the computer-executable instructions during a second pass of the test program to:

generate a second data seed having a second data seed value;

overwrite the stored first data seed value from the first pass of the test program with the second data seed value;

determine that no user-specified key seed value has been provided;

determine a new value for the used pass parameter, wherein the new value for the used pass parameter is a modular value of the value of the used pass parameter incremented by one with respect to the first value of the mod pass parameter; and set the used pass parameter to the new value.

13. The system of claim 12, wherein the at least one processor is further configured to execute the computer-executable instructions during the second pass of the test program to:

determine one of: i) the program pass counter is equal to one or ii) the new value of the used pass parameter is equal to one and the stored program seed value from the first pass of the test program does not equal a program seed value associated with the second pass of the test program; and generate a third one or more data keys based at least in part on the second data seed having the second data seed value in lieu of the used data seed value from the first pass of the test program.

14. The system of claim 12, wherein the at least one processor is further configured to execute the computer-executable instructions during the second pass of the test program to:

determine i) the program pass counter is not equal to one and ii) the new value of the used pass parameter is not equal to one or the stored program seed value from the first pass of the test program equals a program seed value associated with the second pass of the test program; and generate a third one or more data keys based at least in part on the used data seed value from the first pass of the test program.

15. A computer program product for data key generation during execution of a test program, the computer program product comprising a storage medium readable by a processing circuit, the storage medium storing instructions executable by the processing circuit to cause a method to be performed, the method comprising:
    initializing, in connection with an initial pass of the test program, a key seed to a first default value; and
    during a current pass of the test program:
        generating a data seed having a data seed value;
        storing the data seed value;
        receiving a user-specified key seed value;
        setting the key seed to the user-specified key seed value;
        setting the data seed to the user-specified key seed value;
        generating one or more data keys based at least in part on the data seed having the user-specified key seed value; and
        resetting the data seed to the stored data seed value.

16. The computer program product of claim 15, wherein the current pass of the test program comprises executing a particular test stream of the test program, the method further comprising storing, during the current pass of the test program, the user-specified key seed value as a used data seed value for use in connection with repeated execution of the particular test stream or execution of one or more subsequent test streams.

17. The computer program product of claim 16, the method further comprising:
    initializing, in connection with the initial pass of the test program, a mod pass parameter to a first value, a key pass parameter to a second value, and a used pass parameter to a third value;
    initializing, in connection with the initial pass of the test program, a program pass counter to zero; and
    during the current pass of the test program:
        incrementing the program pass counter by one;
        generating a program seed having a program seed value; and
        storing the program seed value.

18. The computer program product of claim 17, wherein the one or more data keys is a first one or more data keys, and wherein the user-specified key seed value is used to generate a second one or more data keys during a pass of the test program that is prior to the current pass and that resulted in an error output, the method further comprising during the current pass of the test program:
    setting the key pass parameter to a value of the used pass parameter from the prior pass of the test program; and
    setting the used pass parameter to the value of the key pass parameter.

19. The computer program product of claim 18, wherein the data seed is a first data seed, the data seed value is a first data seed value, and the current pass is a first pass of the test program, the method further comprising during a second pass of the test program:
    generating a second data seed having a second data seed value;
    overwriting the stored first data seed value from the first pass of the test program with the second data seed value;
    determining that no user-specified key seed value has been provided;
    determining a new value for the used pass parameter, wherein the new value for the used pass parameter is a modular value of the value of the used pass parameter incremented by one with respect to the first value of the mod pass parameter; and
    setting the used pass parameter to the new value.

20. The computer program product of claim 19, the method further comprising during the second pass of the test program:
    determining that the stored program seed value from the first pass of the test program equals a program seed value associated with the second pass of the test program; and
    generating a third one or more data keys based at least in part on the used data seed value from the first pass of the test program,
    wherein the second pass of the test program is a re-execution of the first pass of the test program.

* * * * *